US008880490B2

(12) United States Patent
Gontmakher et al.

(10) Patent No.: US 8,880,490 B2
(45) Date of Patent: Nov. 4, 2014

(54) CORRELATING TRANSPORTATION DATA

(75) Inventors: Alex Gontmakher, Adliswil (CH);
Noam Ben-Haim, Adliswil (CH)

(73) Assignee: Google Inc., Mountain View, CA (US)

( * ) Notice: Subject to any disclaimer, the term of this patent is extended or adjusted under 35 U.S.C. 154(b) by 488 days.

(21) Appl. No.: 12/980,618

(22) Filed: Dec. 29, 2010

(65) Prior Publication Data

US 2012/0066251 A1 Mar. 15, 2012

Related U.S. Application Data

(60) Provisional application No. 61/381,841, filed on Sep. 10, 2010.

(51) Int. Cl.
*G06F 17/00* (2006.01)
*G06F 17/30* (2006.01)

(52) U.S. Cl.
CPC ............................ *G06F 17/30241* (2013.01)
USPC ........... 707/705; 707/758; 707/769; 701/408; 701/409

(58) Field of Classification Search
USPC .................. 707/705, 758, 769; 701/408, 409
See application file for complete search history.

(56) References Cited

U.S. PATENT DOCUMENTS

| 5,812,069 | A | 9/1998 | Albrecht et al. |
| 6,006,159 | A | 12/1999 | Schmier et al. |
| 6,356,838 | B1 | 3/2002 | Paul |
| 6,374,176 | B1 | 4/2002 | Schmier et al. |
| 6,381,533 | B1 | 4/2002 | Crane et al. |
| 6,560,532 | B2 | 5/2003 | Cayford |
| 6,609,659 | B2 | 8/2003 | Sehr |
| 6,759,972 | B2 | 7/2004 | Gupta et al. |
| 6,810,321 | B1 | 10/2004 | Cook |
| 6,965,325 | B2 | 11/2005 | Finnern |
| 7,245,925 | B2 | 7/2007 | Zellner |
| 7,469,827 | B2 | 12/2008 | Katragadda et al. |
| 2002/0069017 | A1* | 6/2002 | Schmier et al. ............... 701/213 |

(Continued)

FOREIGN PATENT DOCUMENTS

KR 20040086675 A 10/2004
KR 100847350 B1 7/2008

OTHER PUBLICATIONS

Labell, L.N., et al., 'Advanced Public Transportation Systems: The State of the Art, Update '92,' Final Report, Apr. 1992, U.S. Department of Transporation, DOT-VNTSC-FTA-92-3, 103 pages.

(Continued)

*Primary Examiner* — Hosain Alam
*Assistant Examiner* — Jieying Tang
(74) *Attorney, Agent, or Firm* — McDermott Will & Emery LLP

(57) ABSTRACT

Methods, systems, and apparatus, including executable instructions encoded on one or more machine-readable storage media, for correlating transportation data are described. A transportation schedule that includes planned records for first trips and associations between the first trips and corresponding first trip IDs may be accessed. A transportation status update that includes actual records for second trips and associations between the second trips and corresponding second trip IDs may be received. Information relating one or more of the first trip IDs to one or more of the second trip IDs may be obtained. The information may be used to identify a trip that is common to both the transportation schedule and the transportation status update. An update for the trip using the transportation status update may be provided.

17 Claims, 7 Drawing Sheets

(56) References Cited

U.S. PATENT DOCUMENTS

| | | | |
|---|---|---|---|
| 2004/0139101 | A1 | 7/2004 | Watanabe et al. |
| 2005/0251330 | A1 | 11/2005 | Waterhouse et al. |
| 2006/0095277 | A1 | 5/2006 | Noonan et al. |
| 2006/0164259 | A1 | 7/2006 | Winkler et al. |
| 2006/0182055 | A1 | 8/2006 | Coffee et al. |
| 2007/0005236 | A1* | 1/2007 | Peterkofsky et al. ......... 701/201 |
| 2007/0042789 | A1 | 2/2007 | Moton, Jr. et al. |
| 2007/0061734 | A1 | 3/2007 | Abdulhayoglu |
| 2007/0198276 | A1 | 8/2007 | Hinrichs et al. |
| 2008/0054072 | A1* | 3/2008 | Katragadda et al. ......... 235/384 |
| 2008/0208451 | A1* | 8/2008 | Minami .................... 701/201 |
| 2009/0037212 | A1* | 2/2009 | Chen et al. ................ 705/1 |
| 2010/0197325 | A1* | 8/2010 | Dredge ................... 455/456.3 |
| 2010/0228574 | A1* | 9/2010 | Mundinger et al. ......... 707/705 |
| 2011/0238690 | A1* | 9/2011 | Arrasvuori et al. ......... 707/769 |

OTHER PUBLICATIONS

Fallon, Eamonn, 'Dublin Bus Tracking Service: Design and Implementation of a Device Independent Passenger Information System,' Dissertation submitted to the University of Dublin, Sep. 2000, 100 pages.

Symes, D.J., 'Automatic Vehicle Monitoring: A Tool for Vehicle Fleet Operations,' IEEE Transactions on Vehicular Technology, vol. VT-29, No. 2, May 1980, pp. 235-237.

Leong, Robert, 'An Unconventional Approach to Automatic Vehicle Location and Control for Urban Transit,' IEEE Vehicle Navigation and Information Systems Conference 1989, Sep. 11-13, 1989, pp. 219-223.

Casey, R.F., et al., 'Advanced Public Transportation Systems: The State of the Art, Update '96,' Final Report, Jul. 1996, U.S. Department of Transporation, DOT-VNTSC-FTA-95-13, 162 pages.

Dailey, D.J., et al., 'Automatic Transit Location System,' TNW 96-04 Final Research Report, Research Project Agreement T9903, Task 7, Feb. 1996, 55 pages.

Schweiger, C.L., et al., 'Advanced Public Transportation Systems: The State of the Art, Update '94,' Final Report, Jan. 1994, U.S. Department of Transportation, DOT-T-94-09, 152 pages.

Kanaan, Ziad Y., 'A Review of Automatic Vehicle Location Technologies and Applications to Commercial Transportation,' Master's Thesis, Massachusetts Institute of Technology, May 1995, 149 pages.

Lam, Chi Fun Jimmy, The Application of Information Technologies to Public Transportation, Master's Thesis, Massachusetts Institute of Technology, Jun. 1994, 222 pages.

"TrainSTAT™ Automated Vehicle Location (AVL) and Passenger Information Management System (PIMS)," Ensco, Inc., 2004, 2 pages.

'Zipdash' [online], zipdash, 2005, [retrieved on Jun. 20, 2005]. Retrieved from the Internet: <URL: www.zipdash.com/>.

* cited by examiner

CORRELATING TRANSPORTATION DATA

CROSS REFERENCE TO RELATED APPLICATION

This application claims priority to U.S. Provisional Application No. 61/381,841, filed on Sep. 10, 2010. The entire contents of U.S. Provisional Application No. 61/381,841 are incorporated herein by reference.

TECHNICAL FIELD

This document generally describes correlating transportation data.

BACKGROUND

Transportation schedules for buses, trains, subways, and other modes of transportation are often provided to help travelers plan their trips. Due to a variety of factors, transportation schedules are not always carried out as planned. For example, when heavy traffic causes a bus to be delayed, potential passengers can no longer rely on the timing of the planned schedule. Even when current information about a transportation mode is available, it can be difficult to associate current information with scheduled information.

SUMMARY

This document describes techniques for correlating scheduled transportation data and real-time status information relating to trips included in the scheduled transportation data. In general, real-time status information can be matched to scheduled information even when a trip or route is associated with one identifier in scheduled information and a different identifier in the status information.

Techniques described herein include accessing a transportation schedule that includes planned records for first trips, where the first trips are associated with corresponding first trip IDs, and receiving a transportation status update (status information) that includes actual records for second trips, where the second trips are associated with corresponding second trip IDs. The techniques also include obtaining information (e.g., a translation table or other available information) relating one or more of the first trip IDs to one or more of the second trip IDs, using the information to identify a trip that is common to both the transportation schedule and the transportation status update, and providing an update for the trip using the transportation status update.

The techniques described herein also include that, for example, the information relating one or more of the first trip identifiers to one or more of the second trip identifiers can be part of a translation table, and that the translation table can be part of the transportation status update. The information relating one or more of the first trip identifiers to one or more of the second trip identifiers can be part of a translation table, and the translation table can be generated by correlating information included in the planned records to information included in the actual records. The information included in the planned records and the information included in the actual records can include one or more of trip timetables, transportation line names, station names, and geographic coordinates.

The information relating one or more of the first trip identifiers to one or more of the second trip identifiers can be part of a translation table and the translation table can be generated based on information included in different versions of the transportation schedule. The information relating one or more of the first trip identifiers to one or more of the second trip identifiers can be a second transportation schedule including planned records for the second trips, and the second trips can be associated with the corresponding second trip identifiers. Actual records for second trips can be compared with the planned records for first trips, and based on comparing the actual records for second trips with the planned records for first trips, a trip can be identified that is included in the second trips and not included in the first trips.

The techniques described herein also include comparing schedule information that includes planned records for first trips with records for second trips, where the first trips are associated with first trip identifiers and the second trips are associated with second trip identifiers. Based on the comparison, commonalities can be identified between the first trips and second trips. The commonalities can be used to identify a first and second identifier for a trip. A translation table can be constructed that relates the first and second identifiers.

The records for second trips can include planned records for the second trips. The records for second trips can include actual records for second trips. Identifying commonalities between the first trips and second trips can include correlating, between the first trips and second trips, one or more of trip timetables, transportation line names, station names, geographic coordinates, and trip descriptions.

All or part of the techniques described herein may be implemented as a computer program product including instructions that are stored on one or more non-transitory machine-readable storage media, and that are executable on one or more processing devices. All or part of the techniques described herein may be implemented as an apparatus, method, or electronic system that may include one or more processing devices and memory to store executable instructions to implement the stated functions.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
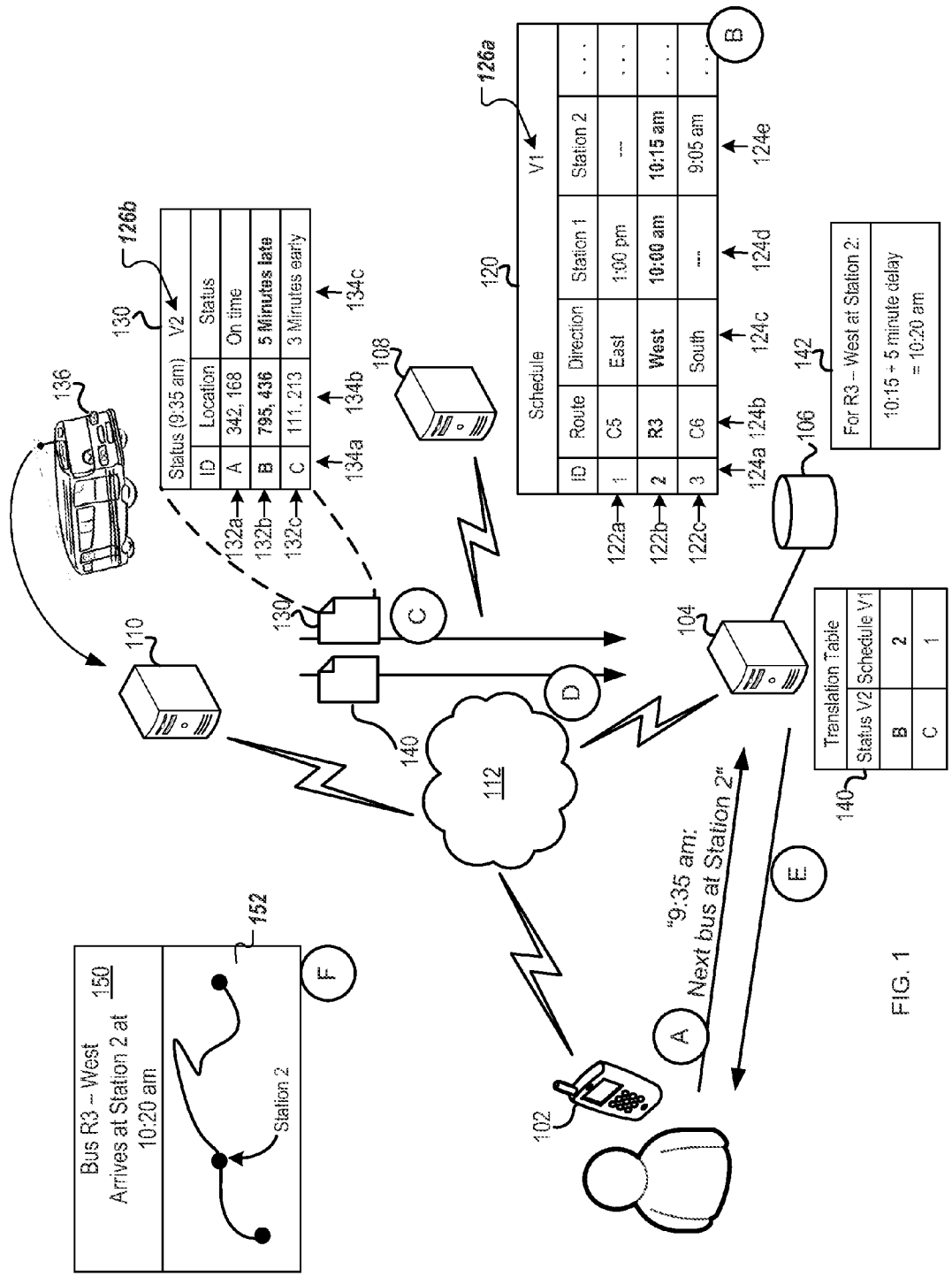
FIG. 1 is a diagram illustrating a system for correlating transportation data.

Described herein are techniques that may be used to provide status updates concerning scheduled transportation (e.g., trips). For example, the techniques may be used to provide a user's mobile device (e.g., a smartphone) with the actual location of a bus that is behind schedule. To provide such information, the techniques described herein correlate information in planned transportation schedules to current status information relating to trips on those schedules.

The transportation schedules and status information identify trips using trip identifiers ("IDs"). In this context, a trip may include any movement of a vehicle between two points, A and B, according to a particular time schedule. Each such movement constitutes a different "trip", even if the same vehicle is making the movement between the same locations, so long as there is at least one variable that is different (e.g., times, number of stops, locations of stops, etc.).

The trip IDs in the transportation schedules and the status information may not match. That is, the same trip may be identified in a transportation schedule using one trip ID and in corresponding status information using a different trip ID. Accordingly, it is not always a trivial matter to correlate trips in transportation schedules to those identified in status information. This is further complicated by the use of different versions of transportation schedules. That is, a transportation authority, such as the Massachusetts Bay Transportation Authority (MBTA), may issue a transportation schedule for one period of time, and then issue updates to that same transportation schedule during the following period. The first period's schedule may be labeled as version 1 (V1) and the second period's schedule may be labeled as version 2 (V2). Sometimes, however, these different versions may use different trip IDs for the same trip. Consequently, it is also not always easy to identify the same trips on different versions of the same transportation schedule.

The techniques described herein include the use of constructs, such as translation tables, to correlate trip IDs and, thereby, identify trips that are common to transportation schedules and status information. After such a trip is identified, and its current status obtained, that information may be provided to a user (e.g., to that user's mobile device). The user thus is able to identify the scheduled trip (e.g., a bus going from Boston to New York), and the current status of that trip (e.g., that the bus is late and will not be arriving in Hartford on-time).

The techniques described herein can be used to correlate data for stations, routes, intersections of stations and trips, and other sets of transportation data and their corresponding identifiers, in addition to matching trips and trip IDs. In addition, the techniques described herein may be used to correlate a set or group of trips to another set or group of trips, or to correlate particular elements of a trip with elements of one or more trips.

To this end, the techniques described herein include accessing a transportation schedule that includes planned records for first trips, where the first trips are associated with corresponding first trip IDs, and receiving a transportation status update (e.g., status information) that includes actual records for second trips, where the second trips are associated with corresponding second trip IDs. The techniques also include obtaining information (e.g., a translation table or other available information) relating one or more of the first trip IDs to one or more of the second trip IDs, using the information to identify a trip that is common to both the transportation schedule and the transportation status update, and providing an update for the trip using the transportation status update.

There are different ways to correlate trip IDs in the transportation schedule and the status information. In an example, a transportation status update can be obtained that includes multiple trip IDs for each trip. Rather than associating a trip with only a trip ID corresponding to the current period of time, the transportation status update can associate each trip with a trip ID for the current period as well as trip IDs for previous periods of time. Accordingly, the transportation status information for each trip can be correlated with transportation schedule information using the current trip ID or a previous trip ID.

In another example, one or more translation tables can be obtained to relate one version of a trip ID with another version of a trip ID. The provider of the transportation status update may provide a translation table that relates current trip IDs with previous versions of trip IDs. Using the translation table, the transportation status update using current trip IDs can be correlated with transportation schedule information that uses trip IDs from previous periods of time.

In another example, a translation table can be constructed based on commonalities identified between one transportation schedule and another transportation schedule. For instance, commonalities between a current transportation schedule and a previous transportation schedule can indicate which trips in the previous schedule are also in the current schedule. By identifying records in both schedules that refer to the same trips, the current IDs and previous IDs for those trips can be determined. The relationships between current IDs and previous IDs can be stored in a translation table and used to correlate transportation status information with transportation schedule information.

In another example, a translation table can be constructed based on commonalities identified between a transportation schedule that uses one set of IDs and a transportation status update that uses a second set of IDs. Commonalities in timetables, descriptions, locations, and other data that can be identified are used to determine which records in the transportation schedule and the transportation status update refer to the same trips. The first IDs and second IDs for the trips described in both the transportation schedule and the transportation status update can be stored in a translation table and used to correlate transportation status information and transportation schedule information.

FIG. 1 is a diagram of a system 100 on which the foregoing techniques may be implemented. FIG. 1 also illustrates a flow of data, shown in actions (A) to (F), as well as a user interface of a client communication device ("client device") 102 during action (F). Actions (A) to (F) may occur in the illustrated sequence, or they may occur in a sequence that is different than that shown.

System 100 includes a client device 102, a server 104, data storage 106, a transportation schedule server 108, a transportation status server 110, and a network 112. The client device 102, server 104, transportation schedule server 108, and transportation status server 110 are communicatively connected by the network 112, which may be wired, wireless or a combination of the two.

During action (A), transportation information is requested by a user of the client device 102. For example, at 9:35 am a user may request information about the next bus that arrives at a location called "Station 2." The request for transportation information can include, for example, a request to navigate to a web page that includes information about public transportation. The client device 102 transmits the request for transportation information to the server 104.

During action (B), the server 104 accesses a transportation schedule 120. The transportation schedule 120 can be accessed in response to receiving the request from the client device 102. To access the transportation schedule 120, the server 104 may retrieve the transportation schedule 120 from the data storage 106. Alternatively, or additionally, the transportation schedule 120 may be received from the transportation schedule server 108.

The transportation schedule 120 can describe planned travel by bus, subway, train, airplane, boat, and other modes of transportation. For example, the transportation schedule 120 may describe all the scheduled bus and train departures and arrivals over a period of time. The transportation schedule 120 can include published schedule information from a transit authority.

The transportation schedule 120 can include information about multiple trips along a single route. For example, the transportation schedule 120 may describe scheduled times that buses may depart from, and arrive at, locations along multiple bus routes. Because multiple buses may follow each route, the schedule characterizes each time that a bus follows the route as a separate trip. Specifically, for a bus route from a first location "A" to a second location "B," a bus that travels the route from A to B beginning at 10:00 am can be considered a different trip than the same bus traveling the route from A to B beginning at 1:00 pm.

The transportation schedule 120 can be expressed in a variety of forms and data structures. For example, the transportation schedule 120 may be a General Transit Feed Specification (GTFS) feed. In FIG. 1, the transportation schedule 120 is illustrated as a table having multiple rows 122a-122c, with each row representing a particular trip. Various types of data for the trips can be organized as columns 124a-124e. Information provided in the transportation schedule 120 can include, for example, route identifiers, directions of travel, times and locations of stops, descriptive information, fare information and other information related to trips.

The schedule information 120 includes information that can help the server 104 to respond to the request of the user from action (A). Specifically, the trip described in row 122b of the transportation schedule 120 is indicated to arrive at "Station 2" at 10:15 am, as indicated by the entry in column 124e. Although the server 104 could provide the scheduled information to the user, it is possible that the bus on the route is not following the schedule exactly. In this regard, variations between the planned transportation schedule and the implementation of each trip may introduce error between planned schedules and the actual trips that occur. For example, a delay for one trip may cause delays in other trips, such as when a delayed train causes other trains on the same track to be delayed. In the foregoing example, if the bus for the trip is early, the user may arrive at the scheduled time and may miss the bus. It is also possible that the trip has been canceled altogether. Additional data may be necessary to determine the actual status of the scheduled trip, as described below.

To help distinguish trips from each other and to help match the information in the transportation schedule 120 to other data, each trip described in the transportation schedule 120 may be associated with a trip ID. In an implementation, each trip ID may be unique within the transportation schedule data set, so that each trip ID corresponds to exactly one trip. For example, as illustrated, trip IDs are listed in the column 124a labeled "ID." The trip corresponding to row 122b of the transportation schedule is associated with a trip ID of "2."

The transportation schedule 120 can also include a version identifier ("ID") 126a to indicate the version of the transportation schedule. A described above, variations of the same schedule may be issued as different versions. These different versions may have at least one trip in common, but may label that trip differently. In this example, the transportation schedule 120 includes the version ID 126a that has a value of "V1." The version ID 126a can indicate, for example, that a particular set of associations between trips and trip IDs is used in the transportation schedule 120. The fact that two different transportation schedules 120 include version IDs 126a with differing values can indicate that the two transportation schedules 120 may not use the same trip IDs to refer to the same trips.

For example, the transportation schedule 120 includes a version ID of "V1", and the trip ID value of "1" for a first version of a transportation schedule may refer to a first trip. But, the value of "1" may refer to a second trip in a second version of a transportation schedule. Thus the associations between trips and trip IDs may not be compatible between different versions.

During action (C), the server 104 receives status information 130 for one or more trips. The status information 130 can describe current information about one or more trips. In some instances, status information 130 may be received separately from the transportation schedule 120 because the transportation schedule 120 may not reflect whether planned trips are actually following the predefined (planned) transportation schedule. Status information 130 can include actual information about a trip such as describing whether a particular trip is delayed or on time. Status information 130 may also describe the current location or speed of a vehicle and other trip characteristics. The status information 130 can be generated by, or received from, a different entity from the one that produced the schedule information 120.

The status information 130 can describe trips in progress and planned trips, but the status information 130 need not include detailed projected information. For example, status information 130 may describe the current location of a bus implementing a trip and whether the bus is currently on time. The status information 130 need not describe, however, each of the stops the bus will make over the next hour, the final destination of the bus, or whether the trip will be repeated the next day, although it may describe such information.

The status information may be obtained from one or more vehicles 136 as a trip progresses. For example, a Global Positioning System (GPS) receiver on the vehicle 136 may determine a real-time position of the vehicle, and the position may be transmitted to the status information server 110. The status information server 110 can collect status information 130 for multiple trips and then transmit the status information 130 to the server 104.

The status information 130 is illustrated as a table having rows 132a-132c that each describes a particular trip. As described above, a trip can refer to a particular instance of travel on a transportation route.

Each trip described in the status information 130 can be associated with a trip ID. Each trip ID can be unique for the data set of a particular message or grouping of status information 130 so that each trip ID corresponds to one trip. The status information 130 can include a version ID 126b that indicates that a particular set of associations between trips and trip IDs is being used.

The trip IDs used in the status information 130 may not be the same as the trip IDs used in the transportation schedule 120, even for trips that are common to both transportation schedule 120 and the status information 130. Similarly, the associations between a trip and a trip ID may not be the same in one version of the status information 130 as the associations between a trip and trip ID in another version of the status information 130.

A transportation schedule 120 and status information 130 may use different trip IDs for the same trip for a variety of reasons. For example, status information may be received from a different source than the transportation schedule, and the different sources may use different associations between trips and trip IDs. Even when the trip IDs are intended to be used consistently in the schedule information and the status information, errors may cause trip IDs to be used inconsistently. In addition, the server 104 may need to relate status information 130 using one version of trip ID associations to a transportation schedule 120 that uses a different version of trip ID associations.

In action (D), the server 104 obtains translation information relating a trip ID used in the transportation schedule 120 and a trip ID used in the status information 130. For example, the server 104 may obtain a translation table 140 that indicates which trip IDs used in the transportation schedule 120 refer to the same trips described in the status information 130. A translation table 140 or similar information may be transmitted from the status information server 110 to the server 104. That is, the translation table may be obtained along with the current status information. Alternatively, a translation table 140 may be retrieved from the data storage 106 or may be generated by the server 104. That is, the translation table may have been previously received and stored or it may be generated dynamically.

To present accurate transportation information to a user, the server 104 may need to match the status information 130 for a trip with the transportation schedule 120 for the trip. Considered separately, status information 130 or a transportation schedule 120 may not accurately describe a trip. Status information 130 may lack the detail to allow the server to extrapolate beyond the current location of a vehicle implementing a trip. Schedule information, although it gives more detailed information about a trip, may be inaccurate due to variance from the schedule in actually carrying out a trip. By matching the status information to the schedule information, however, the status information can be used as a reference point to fine-tune the schedule information to take into account delays and last-minute schedule changes.

Because the trip IDs in the status information 130 and the transportation schedule 120 may be different, the translation information may be used to match the status of a trip with the schedule for the trip. Translation information can relate status information 130 for a trip with the scheduled information for the trip by relating a trip ID from the status information 130 to a trip ID from the transportation schedule 120 for the same trip.

With the translation table 140, the server 104 can match the status of a trip with the schedule for the trip using the trip IDs associated with the trip in the transportation schedule 120 and the status information 130. For example, the trip for which the user requested information in action (A) is represented as row 122b of the transportation schedule 120. In the transportation schedule 120, the trip has a trip ID of "2." Using the translation table 140, the server 140 can determine, for example, that the same trip has a trip ID of "B" in the status information 130. As a result, the server 104 may determine that row 132b of the status information 130 describes the trip and that the trip is currently 5 minutes late.

By matching the status information 130 to the transportation schedule 120 for the trip of interest, the server 104 can use the resulting information to determine a more accurate schedule for a trip than may be possible with either the transportation schedule 120 or the status information 130 alone. The calculation chart 142 indicates, for example, that although the trip in row 122b of the transportation schedule 120 (Route "R3" traveling "West") is scheduled to arrive at "Station 2" at 10:15 am, taking into account the current delay of 5 minutes indicated in the status information 130, the bus implementing the trip will most likely arrive at "Station 2" at 10:20 am instead of the scheduled time.

It may be necessary to correlate different schedules, or different versions of schedules, with each other and with the status information, depending upon the content of the translation table. For example, if a translation table only correlates version V2 a schedule to status information, and the version of the schedule under consideration is V1, it may be necessary to correlate the trip IDs of schedule versions V1 and V2. Then, the status information for version V2 may be obtained from the translation table, and the result correlated to version V1.

To determine if a translation table 140 may be used to match the status information 130 to the transportation schedule, the server 140 may compare a version ID of the transportation schedule 120 to a version ID of the status information 130. In some implementations, equal version IDs indicate that trip IDs are used in the same manner while different version IDs indicate that translation may be needed. For example, the status information 130 has a version ID 126b of "V2" which is different from the version ID 126a of "V1" that is included in the transportation schedule 120. This indicates, for example, that the translation table 140 may be used to correlate the trip IDs used in the transportation schedule 120 with the trip IDs used in the status information 130.

In addition to correlating trips and trip IDs, the same techniques can be used to correlate routes with multiple versions of route identifiers, to correlate station information with differing station identifiers, and to correlate particular passages or links that that make up individual trips with corresponding identifiers. In short, although these techniques are described with respect to trips and trip IDs for clarity, the techniques may also be used to correlate transportation data that is more or less inclusive than an individual trip.

In addition, or alternatively, the translation information may be used to identify trips that are described in the status information 130 but are not described in the transportation schedule 120. In other words, new trips that were not planned may be identified using the translation information. For example, the status information 130 may refer to a trip that is assigned a particular trip ID for the version 2 set of identifiers, but the translation information may indicate that no corresponding trip ID exists for the version 1 set of identifiers. In another instance, the translation table 140 may not make any mention of a trip ID in one version if there is no corresponding trip ID in another version. Using the translation information, trips that are described in the status information 130 but not described in the transportation schedule 120 can be identified.

Referring back to FIG. 1, in action (E), the server 104 transmits, to the client device 102, the requested information. For example, the results of the calculation of the expected status of a trip may be transmitted.

During action (F), transportation information is provided to the user on a user interface 150 of the client device 102. The transportation information can be provided in response to the request from the user in action (A) and may incorporate information from the transportation schedule 120 and the status information 130. For example, information about one or more trips may be presented on the user interface 150, which may include an updated schedule that reflects changes to a published schedule due to current status of a trip. For example, a time may be presented that includes a deviation from a published schedule. As another example, unmodified information from a published schedule may be presented with an additional note that indicates the current status for the trip, for example, "Arrives at Station 2 at 10:15 am (currently 5 minutes late)." Additionally, the transportation information may be provided as a map or other graphical representation.

FIGS. 2A, 2B, 3 and 4 illustrate translation tables, and methods of generating translation tables, that may be used in the process depicted in FIG. 1. As described above, the translation tables of FIGS. 2A, 2B, 3 and 4, or portions thereof, may be retrieved from data storage 106 or may be generated by computer program(s) executing in server 104. That is, the translation tables may have been previously received and stored or they may be generated dynamically. Alternatively, the translation tables of FIGS. 2A, 2B, 3 and 4, or portions thereof, may be received by server 104 along with status information from transportation status server 110, or they may be received by server 104 along with transportation schedule(s) from transportation schedule server 108.

Figure 2:
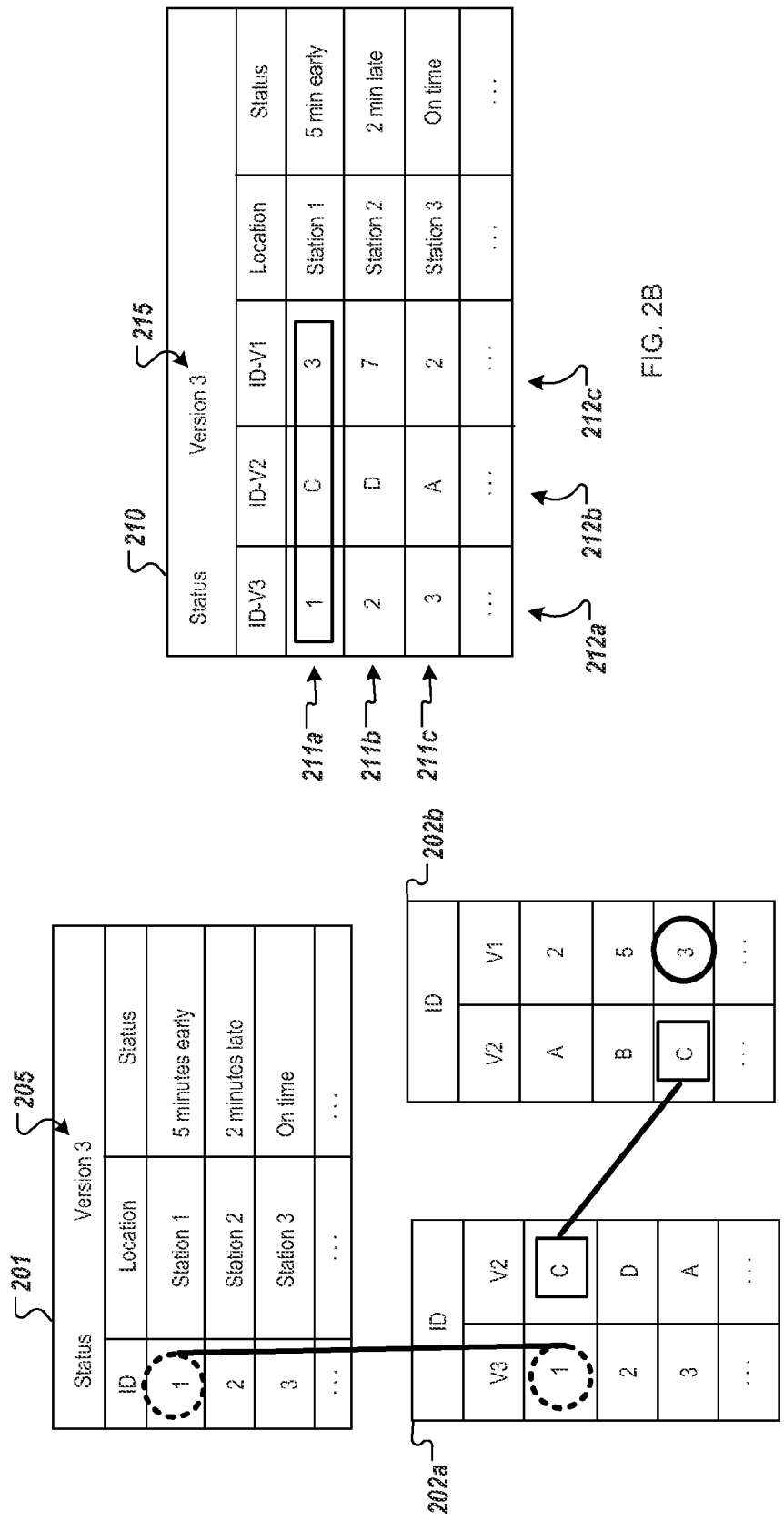
FIGS. 2A and 2B are diagrams illustrating examples of transportation data.

FIG. 2A shows a way in which information relating one set of trip IDs to another set of trip IDs may be transmitted, received, and stored. FIG. 2A includes data structures for status information 201 and translation tables 202a, 202b. A set of trip IDs refers not only to the specific values used in the set, but also the associations for those values. In other words, two sets of trip IDs can be different, even if the sets span the same numerical range, if the associations between the numbers and corresponding trips are different.

The status information 201 associates trips with a trip ID. The version ID 205 with a value of "Version 3" indicates the particular set of trip IDs and associations that are used. The translation tables 202a, 202b can also be transmitted to relate trip IDs of one version to trip IDs from another version. The translation tables 202a, 202b can be transmitted together with the status information 201 or can be transmitted separately.

The translation table 202a relates trip IDs from version 3 to version 2 (abbreviated as "V3" and "V2," respectively). Translation table 202b relates trip IDs from version 2 to version 1 (abbreviated as "V2" and "V1," respectively). The different versions may correspond, for example, to a current set of trip IDs and a former set of trip IDs that was previously used. The different versions may also correspond to a set of trip IDs produced by one system and a different set of trip IDs produced by another system. Other types of versions are also possible.

As illustrated by the connecting lines, the relationships in the translation tables 202a, 202b allow a trip ID used in version 3 to be matched with the trip ID for the same trip in the version 1 set of trip IDs. The trip ID of "1" in version 3 corresponds to the trip ID of "C" in version 2, which corresponds to the trip ID of "3" in version 1. Each of the trip IDs "1," "C," and "3" refers to the same trip in its respective version of trip ID associations.

Status information 201 may be received and processed more frequently than detailed schedule information. As a result, it may be desirable to relate status information 201 to prior versions of schedule information. For example, it may be desirable to relate status information 201 with the set of trip IDs of version 3 to schedule information that uses trip IDs from version 2 or version 1. By providing translation tables 202a, 202b, the status information 201 can be used with schedule information that uses trip IDs from version 2 or version 1. In instances where multiple systems are updated at different speeds, translation tables 202a, 202b may be provided so that a change to the current version of trip IDs does not leave systems that are slower to update without access to the status information 201.

In an implementation, a server that uses the status information 201 may indicate to the provider of the status information 201 when the server no longer uses a particular version of trip IDs. For example, a server may indicate to the provider that the server does not use trip IDs from version 1, and thus does not need a translation table 202b relating to trip IDs from version 1. When the provider of the status information 201 determines that none of the systems receiving the status information 201 use trip IDs from version 1, the provider can stop sending the translation table 202b that relates trip IDs from version 1.

Because trips may be added and canceled between one version and a subsequent version, not every trip in every version may have a corresponding trip ID in a different version. Nevertheless, translation tables 202a, 202b may relate trip IDs from different sets or versions to the extent that such relationships are possible.

FIG. 2B is a diagram illustrating an example of transportation data. FIG. 2B includes a data structure for status information 210, which includes translation information in columns 212a-212c. Each row 211a-211c of the status information 210 represents a different trip.

Columns 212a-212c of the status information 210 act as a translation table for each of the trips described in the status information 210. Even though the status information is shown to have a version ID 215 indicating that the status information is for a "Version 3" set of trip IDs, column 212b and column 212c also include trip IDs for version 1 and version 2. For example, row 211a includes a trip ID of "1" for version 3 (column 212a), which is related to a trip ID of "C" for version 2 (column 212b), which is also related to a trip ID of "3" for version 1 (column 212c). As a result, the status information 210 can be used with any system that identifies trips using trip IDs from version 1, version 2, or version 3.

Figure 3:
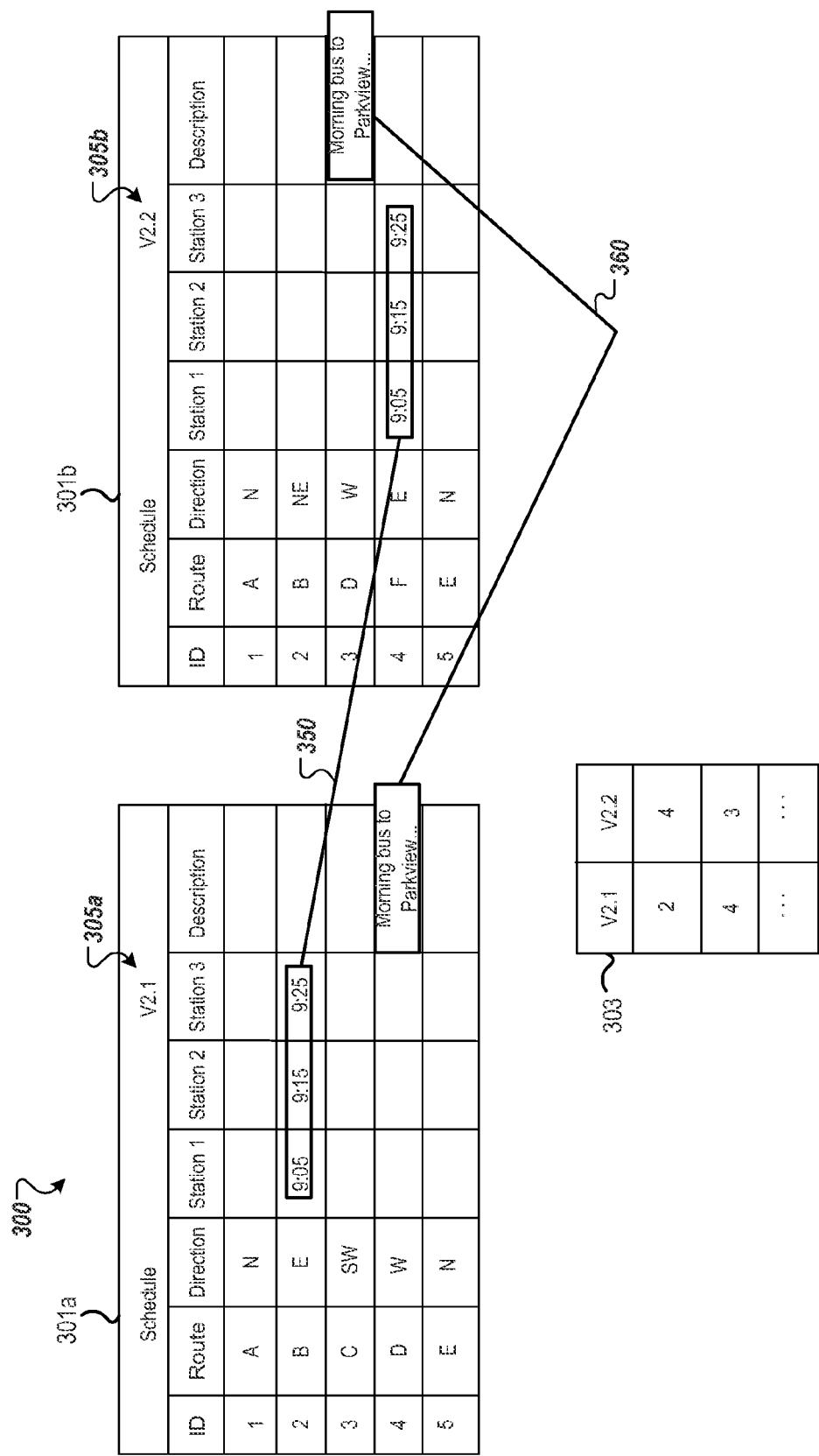
FIGS. 3 and 4 are diagrams illustrating examples of data that can be used to correlate transportation data.

FIG. 3 is a diagram illustrating an example of data that can be used to correlate transportation data. FIG. 3 includes data structures for a first transportation schedule 301a, a second transportation schedule 301b, and a translation table 303.

Correlations among multiple sets of transportation data can be used to construct a translation table 303, which may be used as described above. To construct a translation table 303, data from a first transportation schedule 301a may be compared to data from a second transportation schedule 301b. In particular, the first transportation schedule 301a and second transportation schedule 301b may use different sets of trip IDs to refer to one or more trips that are described by both transportation schedules 301a, 301b. For example, a first version ID 305a indicates that the first transportation schedule 301a uses trip IDs from a set marked "V2.1" while the second version ID 305b indicates that the second transportation schedule 301b uses trip IDs from a different set marked "V2.2."

In an example, the transportation schedule 301b may include current schedule information or newer schedule information than the transportation schedule 301a. Even if some or all of the schedule data of the transportation schedule 301a is outdated, the data may still be useful in identifying commonalities between the two transportation schedules 301a, 301b. Those commonalities can be used to relate trip IDs for the same trip on different schedules. Once the commonalities are used to construct the translation table 303, the relationships between different sets of trip IDs can be used to relate the transportation schedules to status information and other data that may use either set of trip IDs.

Commonalities between trip data can be identified between the time and location data in the first transportation schedule 301a and second transportation schedule 301b. For example, a first relationship 350 can be identified when one or more times and locations for a trip described in the first transportation schedule 301a match one or more times and locations for a trip described in the second transportation schedule 301b. One record in the first transportation schedule 301a may describe a trip that includes stops at "Station 1," "Station 2," and "Station 3" at 9:05, 9:15, and 9:25, respectively. Those stops and times may match, or at least be similar to, times and stops for a trip described in the second transportation schedule 301b. Based on the common stops and times, as well as other commonalities that may exist, it may be determined that the data in each transportation schedule 301a, 301b refers to the same trip. Accordingly, the trip ID for the trip from the first transportation schedule 301a (with a value of "2") may be related to the trip ID for the trip from the second transportation schedule 301b (with a value of "4").

Commonalities between trip data can also be determined between descriptions of a trip in both the first transportation schedule 301a and second transportation schedule 301b. For example, a trip in both transportation schedules 301a, 301b includes the description "Morning bus to Parkview . . . ," shown in relationship 360. Based on the identified commonality, having a common description, it may be determined that the descriptions refer to the same trip. Thus the trip ID "4" in the first transportation schedule 301a can be determined to correspond with the trip ID of "3" in the second transportation schedule 301b.

Other commonalities, based on data for a route, direction, and other trip characteristics can also be identified and used to relate a trip ID in the first transportation schedule 301a to a trip ID in a second transportation schedule 301b. Multiple commonalities and multiple aspects of various trips may be compared to determine that a trip ID in fact corresponds to another trip ID. For example, even though a route identifier corresponding to a first trip ID may match a route identifier corresponding to another trip ID, the two trip IDs may not refer to the same trip. It is possible, for example that the direction of travel has changed. As a result, in some implementations, trip IDs may be matched only when multiple commonalities exist between two trip records. Nevertheless, when the commonalities are very detailed, such as when a description exactly matches another description, a single commonality may be sufficient.

Based on the commonalities identified, the translation table 303 can be constructed to include the relationships determined between trip IDs from the first set and the second set of trip IDs. In addition, the first transportation schedule 301a and second transportation schedule 301b can also be compared to determine differences that indicate trips that are described in only one of the transportation schedules 301a, 301b. For example, if second transportation schedule 301b is more recent than the first transportation schedule 301a, trips described in the second transportation schedule 301b and not described in the first transportation schedule 301a may indicate trips that have been added since the first transportation schedule 301a was created. Similarly, a trip described in the first transportation schedule 301a that is not described in the second transportation schedule 301b may be identified as a trip that was cancelled after the first transportation schedule 301a was created. Information about trips that are determined to be added or cancelled, in addition to information about other trips, can be included in the translation table 303 and provided to a user in an update about one or more trips.

Based on commonalities in transportation data, translation tables can be constructed not only for individual trips, but also for routes, stations, links (such as a section from one station to another), or passages of travel. For example, a passage may be the intersection of a trip and a station, such as a particular stop at a particular time during a particular route. Just as trip IDs are correlated in the translation table 303, a translation table may be constructed based on commonalities to relate passage identifiers to each other.

Figure 4:
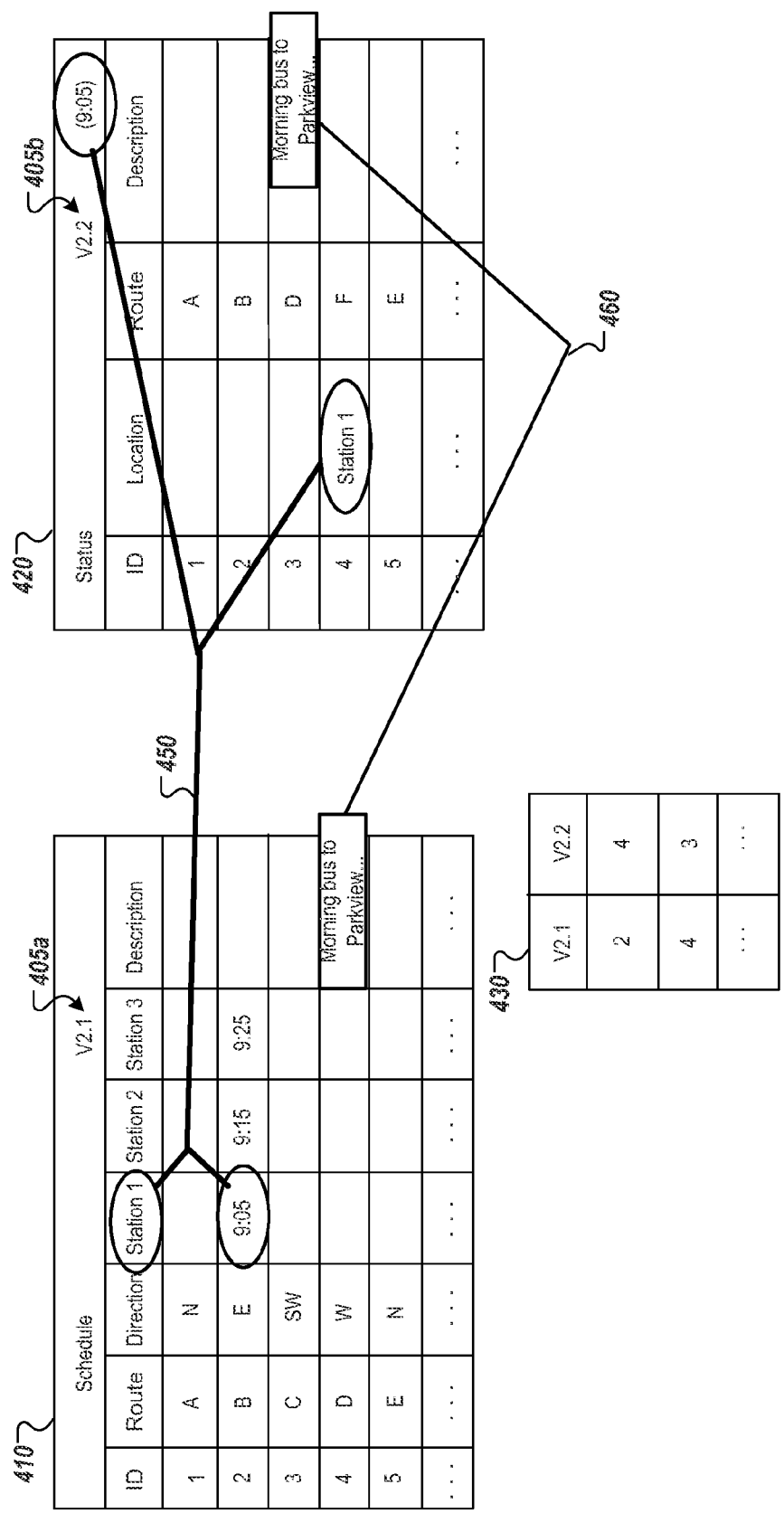

FIG. 4 is a diagram illustrating an example of data that can be used to correlate transportation data. FIG. 4 includes data structures for a transportation schedule 410, status information 420, and a translation table 430.

To construct a translation table 430, commonalities can be identified between data in the transportation schedule 410 and status information 420. Unlike the commonalities described for FIG. 3, which related schedule information to other schedule information, relationships 450, 460 in FIG. 4 relate schedule information to status information.

The transportation schedule 410 may use a first set of trip IDs, indicated by a version ID 405a of "V2.1." The status information 420 may use a second set of trip IDs, indicated by a version indicator 405b of "V2.2."

Commonalities may be identified between scheduled times and locations and actual times and locations. For example, relationship 450 represents a time when a vehicle for a trip is scheduled to arrive at a location called "Station 1" at a time of "9:05." That trip has a trip ID of "2" for the set of trip IDs for "V2.1." The status information 420, reflecting the current status of trips at a time of "9:05," indicates that at a vehicle for a trip is in fact at the location of "Station 1," and that the trip ID for the trip is "4" in the set of trip IDs for "V2.2." Because the actual location of the vehicle coincides with the scheduled time and location of the vehicle, it may be determined that the related information refers to the same trip. Thus the trip ID "2" for the set "V2.1" can be related to the trip ID "4" for the set "V2.2." In general, correlations between times and places may be more accurate in the morning or at the beginning of a shift, when variance from a schedule has not had a chance to compound and propagate through a transportation system.

Similarly, commonalities can be determined based on other information, including descriptive information, which may include route identifiers, travel directions, and other trip characteristics. For example, a relationship 460 between a trip record in the transportation schedule 410 and the status information 420 may be determined when the description of trips is the same or similar. Because the trip with trip ID "4" in the set for "V2.1" has the same description as the trip with the trip ID "3" in the set for "V2.2" it may be determined that both trip IDs refer to the same trip and that the relationship should be entered in the translation table 430.

In addition to matching trip IDs, the transportation schedule 410 and status information 420 can be compared to identify new trips that are described in the status information 420 and not described in the transportation schedule 410. Similarly, the transportation schedule 410 and status information 420 can be compared to identify trips that were canceled, which may be indicated by a trip being described in transportation schedule 410 but not described in the status information 420. Information about new trips and cancelled trips can be recorded in the translation table 430 and ultimately used in providing an update about a trip.

As described above, commonalities can be used to correlate routes, stations, links, and passages in addition to correlating trips. As an example, if station names change during a transition from a former version of data to a current version, commonalities among trips and times may be used to correlate current and former station names. Similarly, commonalities among times and stations for particular trips may be used to correlate route identifiers if route identifiers have changed.

Figure 6:
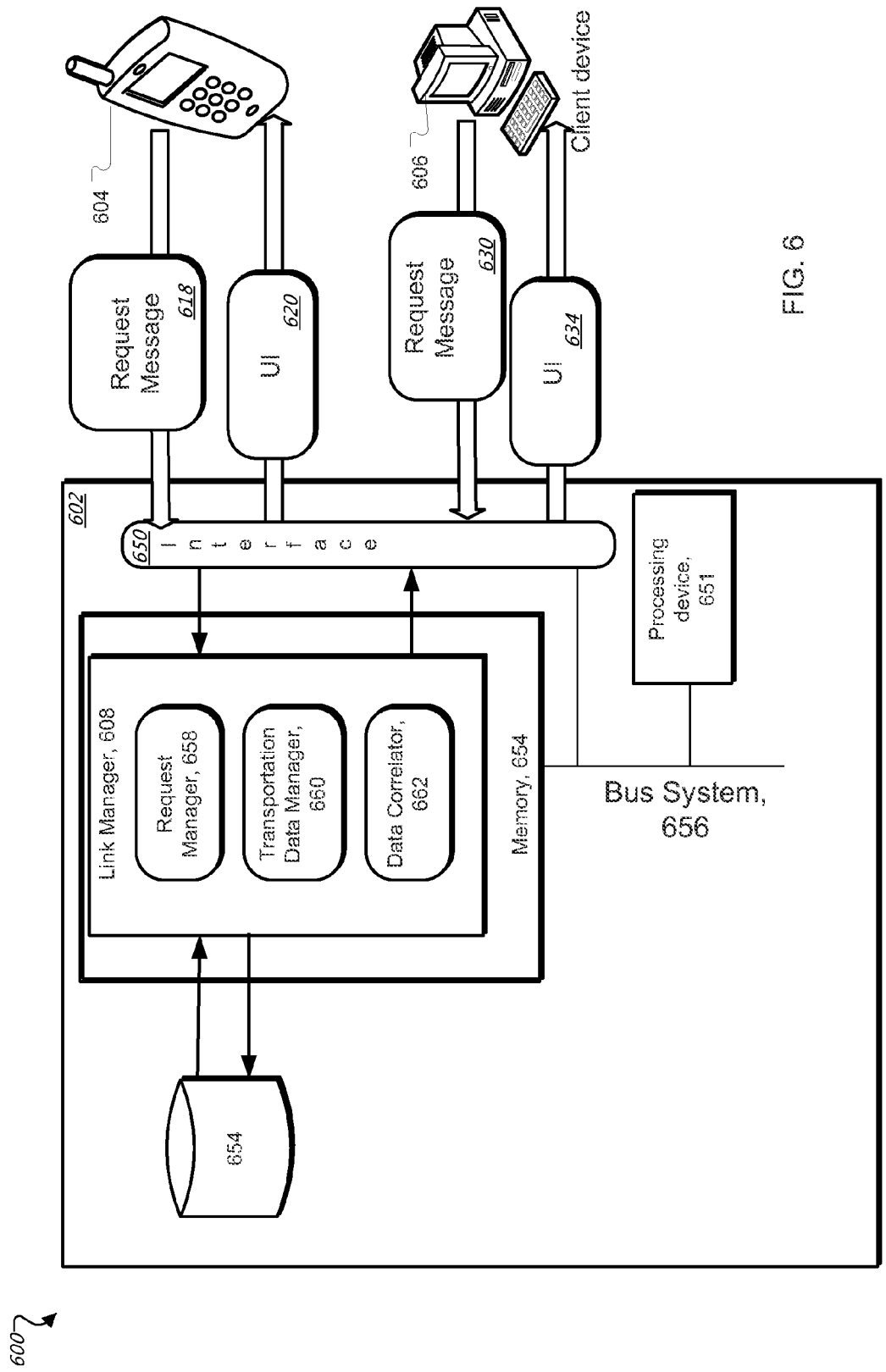
FIG. 6 is a block diagram of components of a system for correlating transportation data.

FIG. 6 is a block diagram of components of a system 600 for correlating transportation data.

Client devices 604, 606 can be any sort of computing devices capable of taking input from a user and communicating over a network (not shown) with server 602 and/or with other client devices. For example, client devices 604, 606 can be mobile devices, desktop computers, laptops, cell phones, personal digital assistants ("PDAs"), servers, embedded computing systems, and so forth. Server 602 can be any of a variety of computing devices capable of receiving information, such as a server, a distributed computing system, a desktop computer, a laptop, a cell phone, a rack-mounted server, and so forth. Server 602 may be a single server or a group of servers that are at a same location or at different locations.

Server 602 can receive information from client devices 604, 606 via input/output ("I/O") interface 650. I/O interface 650 can be any type of interface capable of receiving information over a network, such as an Ethernet interface, a wireless networking interface, a fiber-optic networking interface, a modem, and so forth. Server 602 also includes a processing device 651 and memory 654. A bus system 656, including, for example, a data bus and a motherboard, can be used to establish and to control data communication between the components of server 602.

Processing device 651 may include one or more microprocessors. Generally speaking, processing device 651 may include any appropriate processor and/or logic that is capable of receiving and storing data, and of communicating over a network (not shown). Memory 654 can include a hard drive and a random access memory storage device, such as a dynamic random access memory, or other types of non-transitory machine-readable storage devices. As shown in FIG. 6, memory 654 stores computer programs that are executable by processing device 651. Among these computer programs are request manager 658, transportation data manager 660, and data correlator 662, each of which are described in further detail below.

Request manager 658 is configured to receive a request message (e.g., request messages 618, 630) and process the request. Request manager 658 may determine the information needed to fulfill the request and respond to the request when the appropriate information is available.

Transportation data manager 660 is configured to access transportation schedule information and transportation status information. Transportation data manager 660 may process and store transportation schedule information, transportation status information, translation tables and other information received through interface 650 in a data repository 654 and also retrieve information from the data repository 654.

Data correlator 662 is configured to compare transportation status information and transportation schedule information to identify commonalities, as described above. For example, data correlator may compare transportation schedule information to other transportation schedule information or transportation status information to identify commonalities that can be used to relate a first trip identifier to a second trip identifier.

Figure 7:
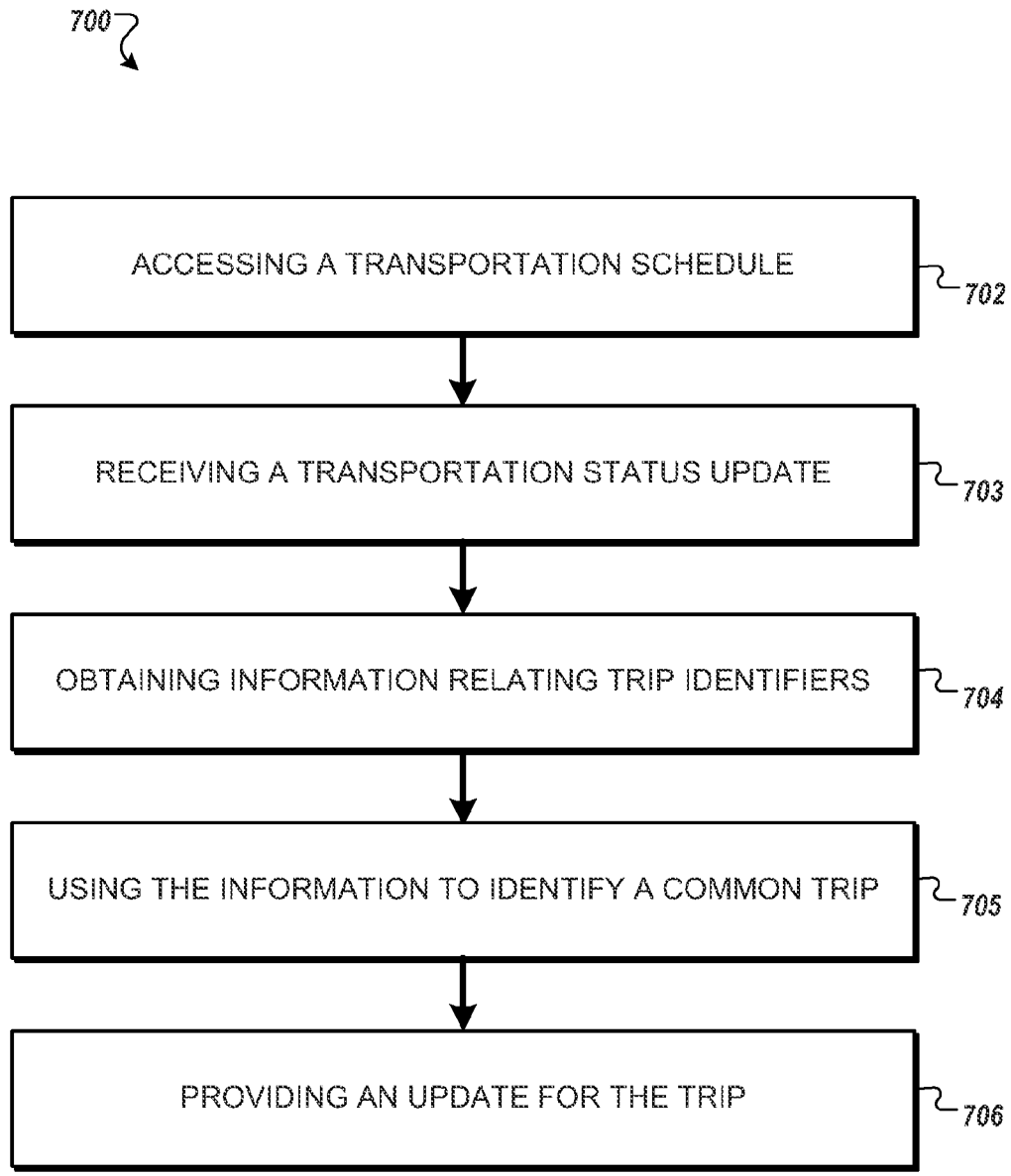
FIG. 7 is a flow chart illustrating an example of a process for correlating transportation data.

FIG. 7 is a flow chart illustrating an example of a process 700 for correlating transportation data that may be implemented on the systems shown in FIGS. 1 and 6. Process 700 may be executed on server 104, for example. Briefly, process 700 includes accessing a transportation schedule that includes planned records for first trips and associations between the first trips and corresponding first trip IDs, receiving a transportation status update that includes actual records for second trips and associations between the second trips and corresponding second trip IDs, obtaining information relating one or more of the first trip IDs to one or more of the second trip IDs, using the information to identify a trip that is common to both the transportation schedule and the transportation status update, and providing an update for the trip using the transportation status update.

In more detail, a transportation schedule that includes planned records for first trips and associations between the first trips and corresponding first trip identifiers is accessed (702). The transportation schedule can include trip timetables, transportation line names, station names, geographic coordinates, descriptions, and other information.

A transportation status update that includes actual records for second trips and associations between the second trips and corresponding second trip identifiers is received (703). For example, the transportation status update can include records describing the actual locations of vehicles for a trip and times that vehicles actually are at those locations. The transportation status update can include trip timetables, transportation line names, station names, geographic coordinates, descriptions, and other information.

Information relating one or more of the first trip identifiers to one or more of the second trip identifiers is obtained (704). The information can include portions of the transportation status update, the transportation schedule, or both the transportation status update and the transportation schedule. The information can be part of a translation table, and the translation table can be part of the transportation status update. The information can also be a second transportation schedule including planned records for the second trips, and the second transportation schedule can include associations between the second trips and corresponding second trip IDs.

The information is used to identify a trip that is common to both the transportation schedule and the transportation status update (705). In addition, in an example, information about the trip can be recorded in a translation table that relates the trip ID corresponding to the trip from the first trip IDs to the trip ID corresponding to the trip from the second trip IDs.

An update for the trip using the transportation status update is provided (706) to the user's mobile device (e.g., smartphone). The update may be provided in response to a request to provide the transportation status update, such as a request to provide information about the trip that is common to both the transportation schedule and the transportation status update.

Process 700 can also include generating a translation table by correlating information contained in planned records to information included in actual records. Process 700 can also include generating a translation table based on information included in different versions of the transportation schedule.

Figure 5:
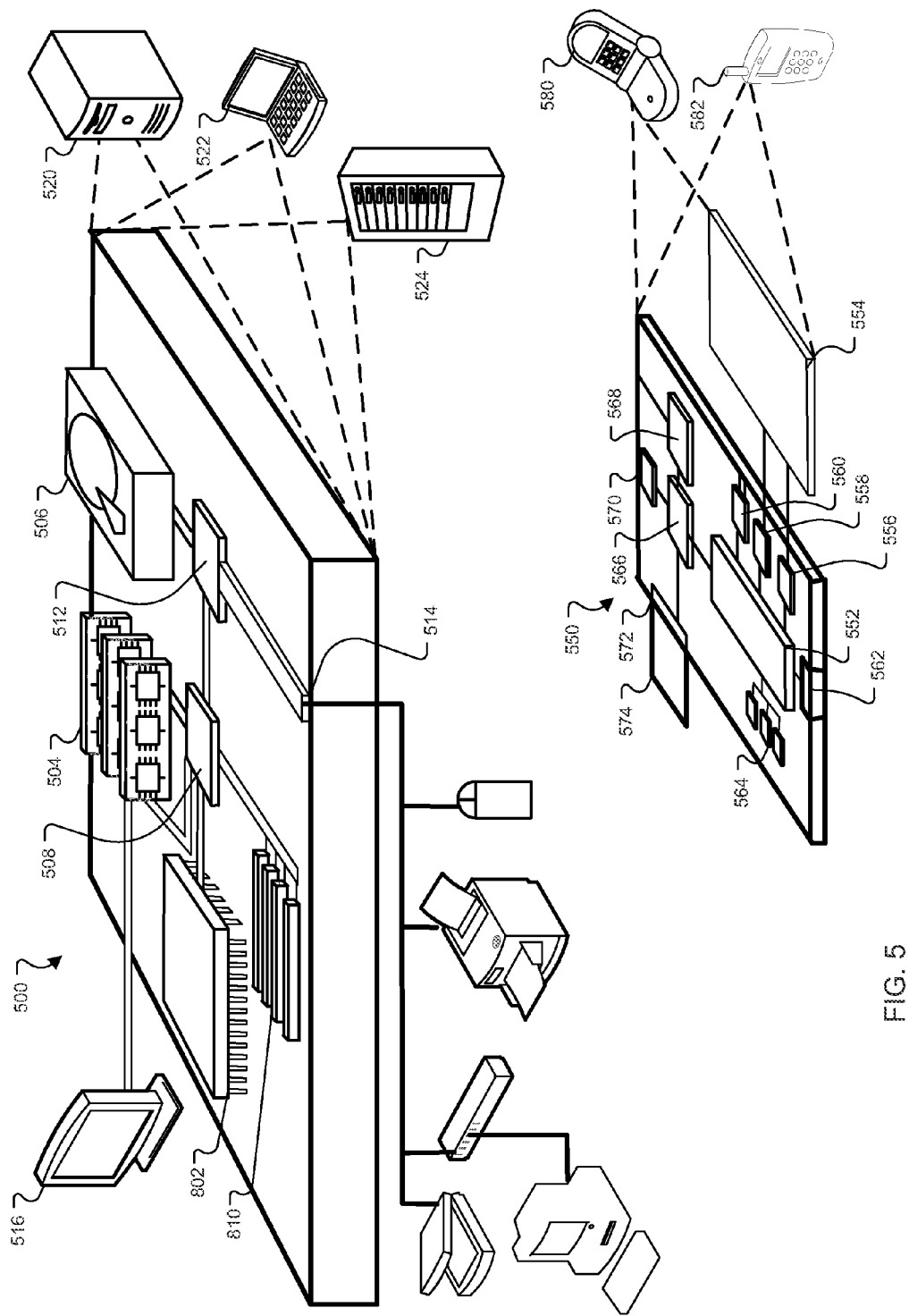
FIG. 5 is a block diagram of computing devices that may be used to implement the systems and methods described in this document.

FIG. 5 is a block diagram of computing devices 500, 550 that may be used to implement the systems and processes described in this document, including client device 102, 604 and server 104, 602. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface controller 508 connecting to memory 504 and high-speed expansion ports 510, and a low speed interface controller 512 connecting to a low-speed expansion port 514 and storage device 506.

Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed interface controller 508 manages bandwidth-intensive operations for the computing device 500, while the low-speed interface controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing devices 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive, solid state storage component, or other device, to provide additional storage. Each of the components 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 502 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The computing system can include clients and servers. A client and server are generally remote from each other and typically interact through a communication network. The relationship of client and server arises by virtue of computer programs running on the respective computers and having a client-server relationship to each other.

Actions A to F of FIG. 1 may be performed in any appropriate order, and are not limited to the order described. The same is true for the actions shown in FIG. 7.

Although a few implementations have been described in detail above, other modifications are possible. Moreover, other mechanisms for correlating transportation data may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more processing devices, comprising:

accessing a transportation schedule comprising planned records for first trips, the first trips being associated with corresponding first trip identifiers;

receiving a transportation status update comprising actual records for second trips, the second trips being associated with corresponding second trip identifiers;

obtaining information relating one or more of the first trip identifiers to one or more of the second trip identifiers from one or more translation tables, the one or more translation tables defining a mapping from one or more of the first trip identifiers to one or more of the second trip identifiers, the one or more translation tables including a first translation table defining a mapping of one or more sets of trip identifiers, including the first trip identifiers, to one another, the one or more sets of trip identifiers corresponding to planned records for first trips, and a second translation table defining a mapping from at least one of the one or more sets of trip identifiers to the second trip identifiers;

using the information to identify a trip that is common to both the transportation schedule and the transportation status update, wherein a trip is common where the trip is identified by a first identifier of the first trip identifiers and a second identifier of the second trip identifiers, wherein the first trip identifier is mapped to the second trip identifier according to the one or more translation tables; and providing an update for the trip at least in part based on using the actual records of transportation status update relating to the second identifier and the planned records of the transportation schedule relating to the first identifier.

2. The method of claim 1, wherein at least one of the one or more translation tables is part of the transportation status update.

3. The method of claim 1, wherein the method further comprises:
generating at least one of the one or more translation tables by correlating information included in the planned records to information included in the actual records.

4. The method of claim 1, wherein the information included in the planned records and the information included in the actual records comprises one or more of trip timetables, transportation line names, station names, and geographic coordinates.

5. The method of claim 1, wherein the method further comprises:
generating at least one of the one or more translation tables based on information included in different versions of the transportation schedule.

6. The method of claim 1, wherein the information relating one or more of the first trip identifiers to one or more of the second trip identifiers further includes a second transportation schedule comprising planned records for the second trips, the second trips being associated with the corresponding second trip identifiers.

7. The method of claim 1, further comprising:
comparing the actual records for second trips with the planned records for first trips; and
based on comparing the actual records for second trips with the planned records for first trips, identifying a trip that is included in the second trips and not included in the first trips.

8. A system comprising:
one or more processing devices; and
one or more non-transitory machine-readable media comprising instructions which, when executed by the one or more processing devices, cause the one or more processing devices to perform operations comprising:
accessing a transportation schedule comprising planned records for first trips, the first trips being associated with corresponding first trip identifiers;
receiving a transportation status update comprising actual records for second trips, the second trips being associated with corresponding second trip identifiers;
obtaining information relating one or more of the first trip identifiers to one or more of the second trip identifiers from at least one or more translation tables, the one or more translation tables defining a mapping from one or more of the first trip identifiers to one or more of the second trip identifiers, the one or more translation tables including a first translation table defining a mapping of one or more sets of trip identifiers, including the first trip identifiers, to one another, the one or more sets of trip identifiers corresponding to planned records for first trips, and a second translation table defining a mapping from at least one of the one or more sets of trip identifiers to the second trip identifiers;
using the information to identify a trip that is common to both the transportation schedule and the transportation status update; and
providing an update for the trip at least in part based on using the actual records of transportation status update relating to the second identifier and the planned records of the transportation schedule relating to the first identifier.

9. The system of claim 8, wherein at least one of the one or more translation tables is part of the transportation status update.

10. The system of claim 8, wherein the method further comprises:
generating at least one of the one or more translation tables by correlating information included in the planned records to information included in the actual records.

11. The system of claim 8, wherein the information included in the planned records and the information included in the actual records comprises one or more of trip timetables, transportation line names, station names, and geographic coordinates.

12. The system of claim 8, wherein the method further comprises:
generating at least one of the one or more translation tables based on information included in different versions of the transportation schedule.

13. The system of claim 8, wherein the operations further comprise:
comparing the actual records for second trips with the planned records for first trips; and
based on comparing the actual records for second trips with the planned records for first trips, identifying a trip that is included in the second trips and not included in the first trips.

14. One or more non-transitory machine-readable storage media for storing instructions that are executable by one or more processing devices to perform operations comprising:
accessing a transportation schedule comprising planned records for first trips, the first trips being associated with corresponding first trip identifiers;
receiving a transportation status update comprising actual records for second trips, the second trips being associated with corresponding second trip identifiers;
obtaining information relating one or more of the first trip identifiers to one or more of the second trip identifiers, the information comprising one or more of one or more translation tables showing a mapping from one or more of the first identifiers to one or more of the second identifiers or a second transportation schedule comprising planned records for the second trips, the one or more translation tables including a first translation table defining a mapping of one or more sets of trip identifiers, including the first trip identifiers, to one another, the one or more sets of trip identifiers corresponding to planned records for first trips, and a second translation table defining a mapping from at least one of the one or more sets of trip identifiers to the second trip identifiers;
using the information to identify a trip that is common to both the transportation schedule and the transportation status update, the trip being associated with a first identifier of the first identifiers and a second identifier of the second identifiers; and
providing an update for the trip using the transportation status update and the transportation schedule.

15. The one or more machine-readable storage media of claim 14, wherein the information relating one or more of the first trip identifiers to one or more of the second trip identifiers is part of a translation table, the translation table being part of the transportation status update.

16. The one or more machine-readable storage media of claim 14, wherein the information relating one or more of the first trip identifiers to one or more of the second trip identifiers is part of a translation table; and
  wherein the operations further comprise:
    generating the translation table by correlating information included in the planned records to information included in the actual records.
17. A system comprising:
one or more processing devices including a processor; and
means for performing operations comprising:
  accessing a transportation schedule comprising planned records for first trips, the first trips being associated with corresponding first trip identifiers;
  receiving a transportation status update comprising actual records for second trips, the second trips being associated with corresponding second trip identifiers;
  obtaining information relating one or more of the first trip identifiers to one or more of the second trip identifiers, the information comprising one or more translation tables showing a mapping from one or more of the first identifiers to one or more of the second identifiers, the one or more translation tables including a first translation table defining a mapping of one or more sets of trip identifiers, including the first trip identifiers, to one another, the one or more sets of trip identifiers corresponding to planned records for first trips, and a second translation table defining a mapping from at least one of the one or more sets of trip identifiers to the second trip identifiers;
using the information to identify a trip that is common to both the transportation schedule and the transportation status update, the trip being associated with a first identifier of the first identifiers and a second identifier of the second identifiers; and
providing an update for the trip using the transportation status update and the transportation schedule.

* * * * *